(12) United States Patent
Steffensmeier

(10) Patent No.: US 6,540,363 B1
(45) Date of Patent: Apr. 1, 2003

(54) HIGH RELIABILITY DISPLAY SYSTEM

(75) Inventor: Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 266 days.

(21) Appl. No.: 09/654,309

(22) Filed: Sep. 1, 2000

(51) Int. Cl.[7] .................. G03B 21/00; G03B 21/22; G03B 21/14; H04N 3/22; H04N 5/74
(52) U.S. Cl. .................. 353/31; 353/44; 353/71; 353/79; 353/86; 353/94; 353/122; 348/745; 348/751; 348/806
(58) Field of Search .................. 353/31, 30, 44, 353/71, 79, 86, 85, 94, 122; 348/745, 751, 750, 806

(56) References Cited

U.S. PATENT DOCUMENTS 3,679,303 A * 7/1972 La Vant .................. 355/40
5,305,029 A * 4/1994 Yoshida et al. .................. 353/37
5,589,956 A * 12/1996 Morishima et al. .................. 359/15
5,626,411 A * 5/1997 Takahashi et al. .................. 353/94
6,309,072 B1 * 10/2001 Deter .................. 353/31

\* cited by examiner

*Primary Examiner*—Russell Adams
*Assistant Examiner*—Magda Cruz
(74) *Attorney, Agent, or Firm*—Nathan O. Jensen; Kyle Eppele

(57) ABSTRACT

A high-reliability display system is disclosed. The display system includes a plurality of projection channels. Each projection channel projects a substantially mutually exclusive portion of an image onto a display area. A controller determines the content and size of each portion that each projection channel projects onto the display area so that the image substantially fills the display area during normal conditions. When one of the projection channels is inoperative, the controller adjusts the portions of the image that are projected by the operative projection channels to optimize the image on the display area.

20 Claims, 6 Drawing Sheets

HIGH RELIABILITY DISPLAY SYSTEM

FIELD OF THE INVENTION

The invention relates to displays, and more particularly, to a system that provides fail-safe display performance.

BACKGROUND OF THE INVENTION

Computer-controlled terminals or displays are commonly used as visual interfaces with computers or other processors. Such displays have been shown to be a possible alternative to instrumentation panels for aircraft or complex machinery. Multiple screens and pull-down menus enable the displays to show a wide variety of information on an as-needed basis. It is possible for several dozen digital or analog dials and indicators to be represented by two or three controllable displays.

In some applications such as avionics or machine control it is important that the display be constantly operational. Redundant viewing systems have been proposed in which a back-up display is provided. If the principal display fails, the back-up display is activated and used. Such a redundant system requires about twice the space of a single display due to the inclusion of the back-up display, and may therefore not be feasible in situations where space is at a premium.

It is therefore an object of the invention to provide a display system that ensures that critical information is always displayed, even in the event of a failure of one of the components of the system.

It is another object of the invention to provide a failsafe display system that minimizes the number of redundant components included therein.

A feature of the invention is a display system having a plurality of projection channels that cooperate to create a substantially tiled image on a display screen, wherein the projection channels are adjusted to optimize the size and content of the displayed image when one of the projection channels becomes inoperative.

An advantage of the invention is that the projection channels compensate for a failed projection channel by adjusting the size, content, and/or proportion of the images projected by the non-failed projection channels.

SUMMARY OF THE INVENTION

The invention provides a display system that includes a plurality of projection channels. Each projection channel projects a substantially mutually exclusive portion of an image onto a display area. A controller determines the content and size of each portion that each projection channel projects onto the display area so that the image substantially fills the display area during normal conditions. When one of the projection channels is inoperative, the controller adjusts the portions of the image that are projected by the operative projection channels to optimize the image on the display area.

The invention also provides a display system for projecting an image on a display area, the image having a size and a content. The system includes a first projection channel having a first light modulator configured to modulate light to form a first portion of the image, and a first variably-focusable lens assembly that focuses the first portion of the image for display on the display area. A second projection channel includes a second light modulator configured to modulate light to form a second portion of the image, and a second variably-focusable lens assembly that focuses the second portion of the image for display on the display area. A third projection channel includes a third light modulator configured to modulate light to form a third portion of the image, and a third variably-focusable lens assembly that focuses the third portion of the image for display on the display area. A controller controls the first, second and third lens assembly such that when the first, second and third projection channels are in an operative state, the first portion of the image is displayed on a first section of the display area, the second portion of the image is displayed on a second section of the display area, and the third portion of the image is displayed on a third section of the display area, wherein each of the first, second and third sections of the display area are substantially mutually exclusive and combine to cover substantially all of the display area. The controller is further configured so that, upon failure of one of the projection channels, the controller adjusts the portions of the image to be projected by the remaining operative channels by controlling the modulators and the variably-focusing lens assemblies of the remaining operative projection channels to optimize the size and content of the image.

The invention also includes a method of providing an image to a display screen. According to the method, a plurality of independent projection channels are provided. Each projection channel is configured for modulating light to create a portion of the image and focusing the image on a section of the display screen. The portion of the image that each projection channel is to project is determined. Light is generated for each projection channel. The light in each projection channel is modulated to produce each portion of the image. Each portion of the image is focused on a section of the display screen. An inoperative projection channel is compensated for by modifying the portions of the desired image that each operative projection channel is to project and by re-focusing each portion on the display screen, to thereby optimize the image that is displayed on the display screen.

DETAILED DESCRIPTION OF THE DRAWINGS

Figure 1:
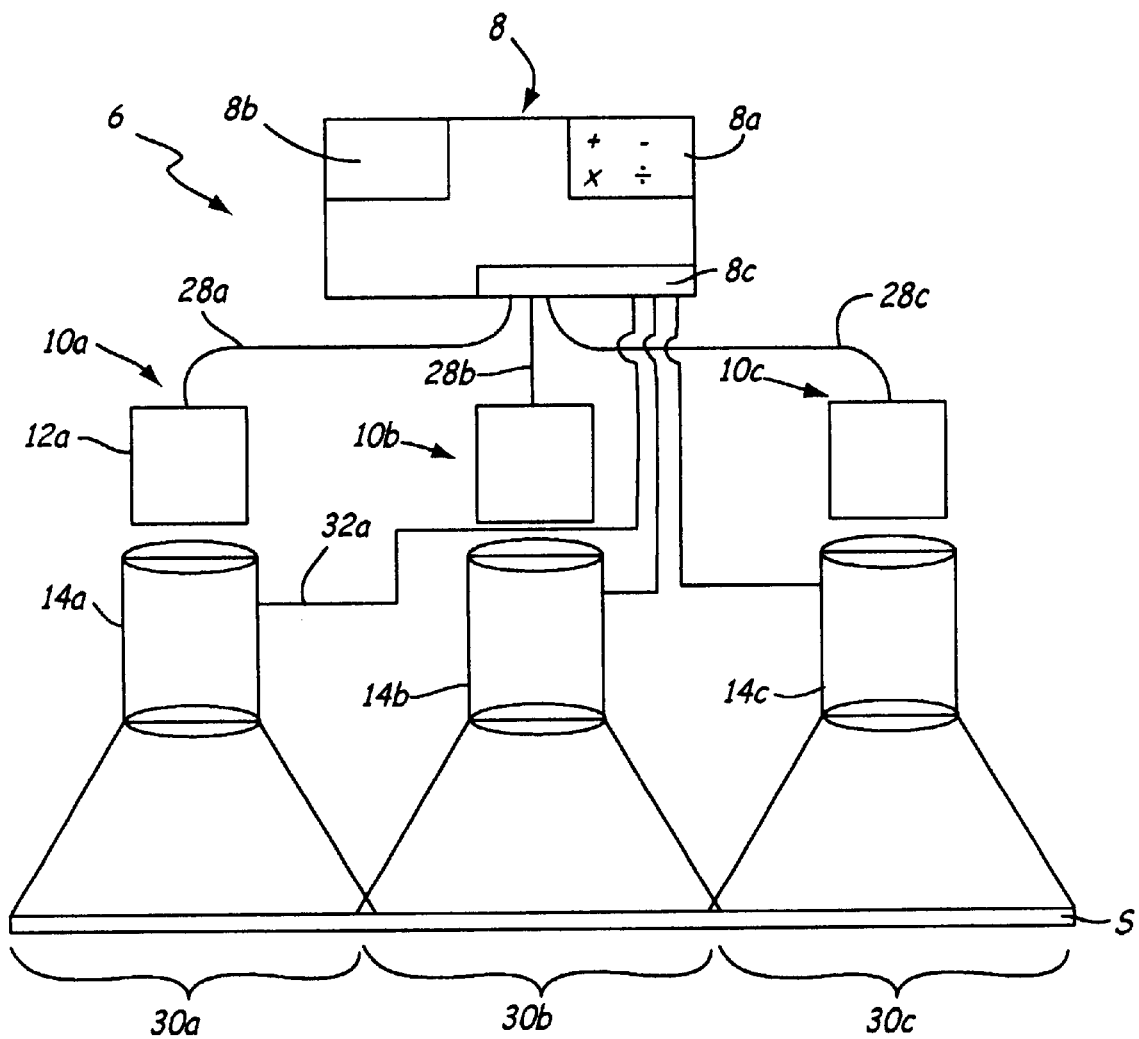
FIG. 1 is a schematic diagram of the multi-channel display system according to the invention.
Figure 2:
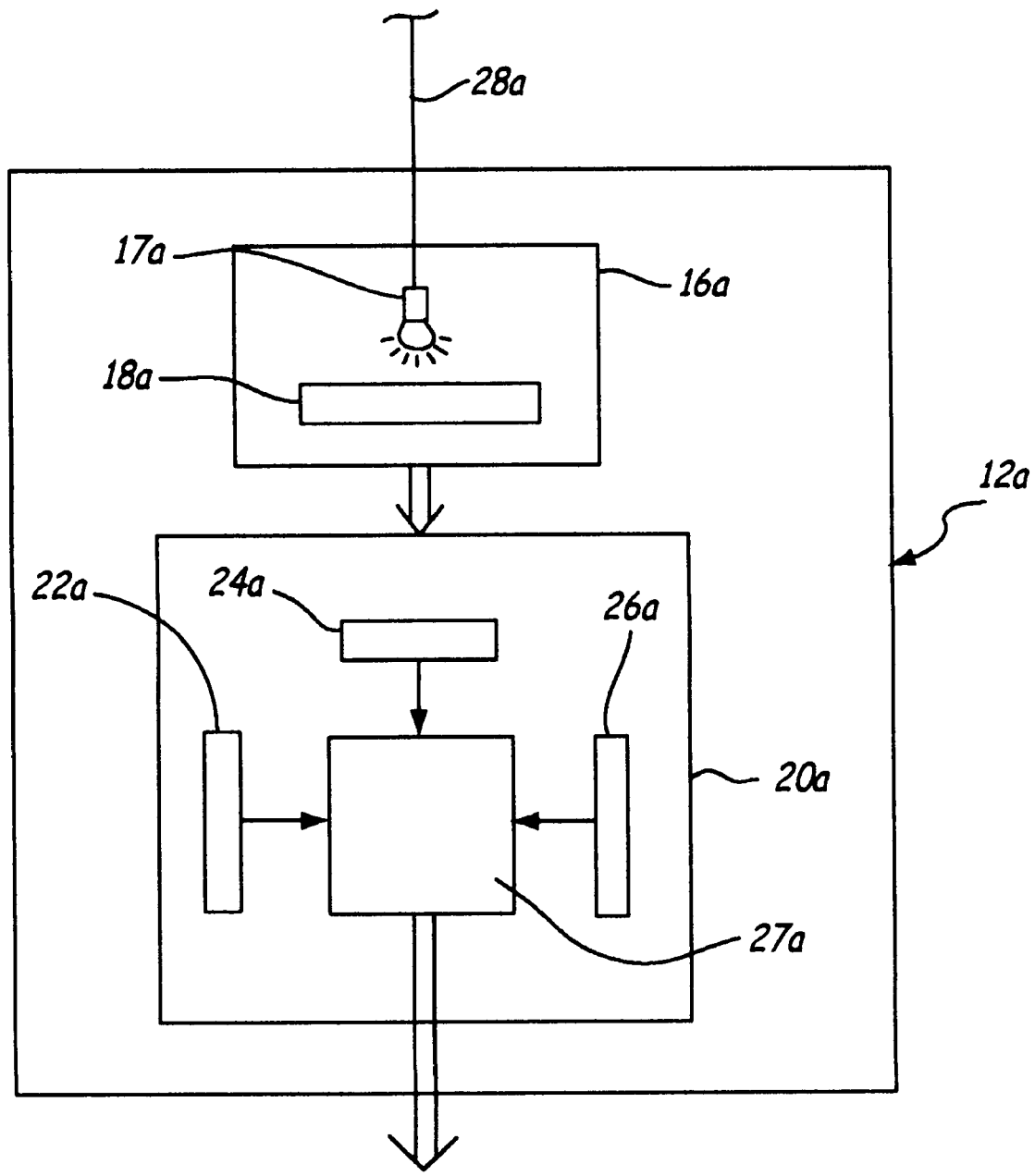
FIG. 2 is schematic view of light transmission module that is used with the display system shown in FIG. 1.

FIG. 1 schematically shows a display system 6 according to an embodiment of the invention. Display system 6 includes a controller 8 that includes a processor 8a, a memory 8b, and an input/output device 8c. Controller is connected to and controls first, second and third projection channels 10a, 10b, and 10c. As will be more fully explained, projection channels 10a, 10b, 10c cooperate to project a substantially tiled image on a display screen S. As each projection channel is substantially identical in construction, only first projection channel 10a will be described in detail, it being understood that second and third projection channels 10b, 10c are similarly constructed. First projection channel 10a includes a light transmission module 12a and a variable-power lens assembly 14a. As shown in detail in FIG. 2, light transmission module 12a includes a variable-brightness light source 16a, which is preferably an arc lamp 17a in combination with a controllable dimming or attenuating device 18a. Attenuating device is preferably a liquid-crystal panel that is connected to controller 8 to vary the light passing therethrough. Light from light source 16a is split and directed by a plurality of optics (not shown) to form backlights for an array of liquid-crystal displays (LCD's) 20a, which is schematically depicted at 20a. LCD array 20a forms a light modulator and preferably includes a red LCD 22a, a green LCD 24a, and a blue LCD 26a whose outputs are combined at 27a, thereby permitting a wide range of colors to be represented. First light transmission module 12a is connected via control wiring 28a to controller 8, which sends a command signal to first light transmission module 12a to control the brightness of light source 16a. Controller 8 also directs LCD array 20a to produce a portion 30a of the image that is to be displayed on display screen S.

Variable-power lens assembly 14a is disposed between light transmission module 12a and display screen S. Lens assembly 14a may include one or more individual lenses, at least one of which is preferably a bi-power lens that is capable of zooming or enlarging an image. Lens assembly 14a focuses and enlarges the portion of the image that is produced by LCD array 20a. Controller 8 controls lens assembly 14a through control wiring 32a so that portion 30a fills part of display screen S. As shown in FIG. 1, first, second and third projection channels 10a, 10b, and 10c project first, second and third portions 30a, 30b, 30c of the image, respectively, onto display screen S. First, second and third portions 30a, 30b, 30c preferably are substantially tiled, which means that the first, second and third portions are projected onto substantially mutually exclusive areas of the display screen.

The operation of the invention under normal circumstances will now be described, with the depicted embodiment being used as a representative illustration. To project an image on display screen S, controller 8 determines the number of working or operative projection channels, which would number three for the depicted embodiment. Controller 8 then determines what portion of the desired image each projection channel is to project onto the display screen. For the depicted embodiment, each projection channel is required to project one-third of the image onto the display screen. The controller separates the desired image into three substantially equal parts and sends signals through control wiring 28a, 28b, 28c to direct the respective light transmission modules to produce the respective portions of the image. Controller 8 also adjusts the brightness of the light sources to ensure consistent brightness among the projection channels. Controller further sends control signals to first, second and third lens assemblies 14a, 14b and 14c so that each portion 30a, 30b, 30c of the image is projected onto one-third of display screen S. As shown in FIG. 1, each portion covers a substantially mutually exclusive area of the display screen. Projection channels 10a, 10b, 10c thereby cooperate to project the complete image such that the image substantially covers the display screen.

Figure 3:
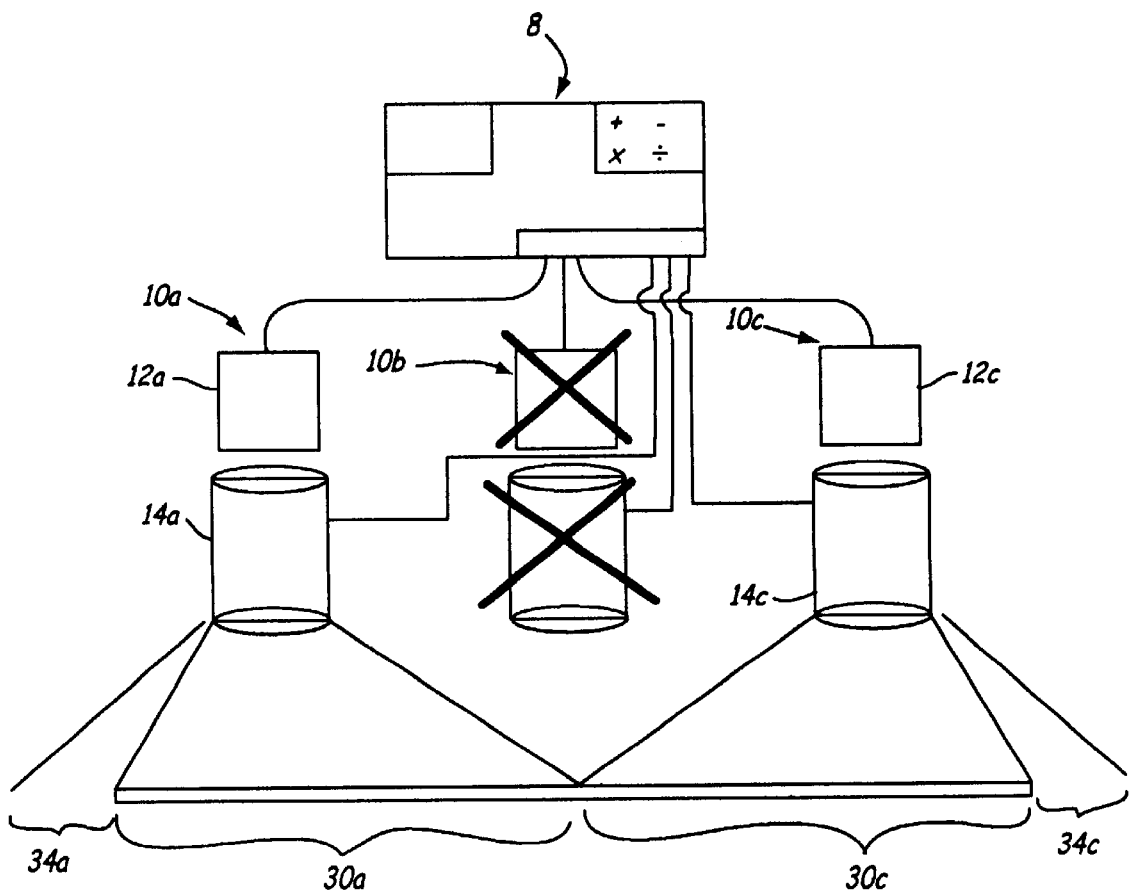
FIG. 3 is a schematic diagram showing the display system of FIG. 1 during a first failure condition.

It is possible that one of the projection channels may fail or become inoperative. This may occur if a light transmission module fails or becomes non-functional, lens assembly 14a breaks or becomes mis-aligned, or when controller 8 cannot otherwise control the projection channel. The invention provides a way to compensate for a failed projection channel by adjusting the remaining functional projection channels to project as much of the image as possible onto display screen S. FIG. 3 shows one possible failure example in which second projection channel 10b is inoperative. Controller 8 refocuses lens assemblies 14a and 14c so that the display screen is substantially covered by first and third projection channels 10a, 10c. Controller 8 may also adjust the brightness of light sources 16a and 16c so that the brightness of the image on the display screen is similar to image brightness when all three projection channels are operative. As shown in FIG. 3, to ensure complete coverage of display screen, lens assemblies 14a and 14c project some light beyond display screen S, as shown by areas 34a and 34c. If part of the image is projected onto areas 34a and 34c, it will not be viewed on display screen S. Controller 8 therefore adjusts the size and content of first and third portions 30a and 30c so that the desired image is projected on the display screen. This is done by modifying the signals sent to light transmission modules 12a and 12c. It is expected that the images created by the light transmission modules in a failure mode will differ in size, proportion, and content from the images created by the light transmission modules in the previously-described fully operational mode. However, the images created by the light transmission modules in the failure mode are focused to the proper size by lenses 14a, 14c to fill the display screen with the desired image so that a viewer viewing display screen S will not detect any substantial difference between the images displayed in FIG. 1 and FIG. 3. The viewer may therefore use the display screen without interruption until it is convenient to repair or replace the failed components in second projection channel 10b.

Figure 4:
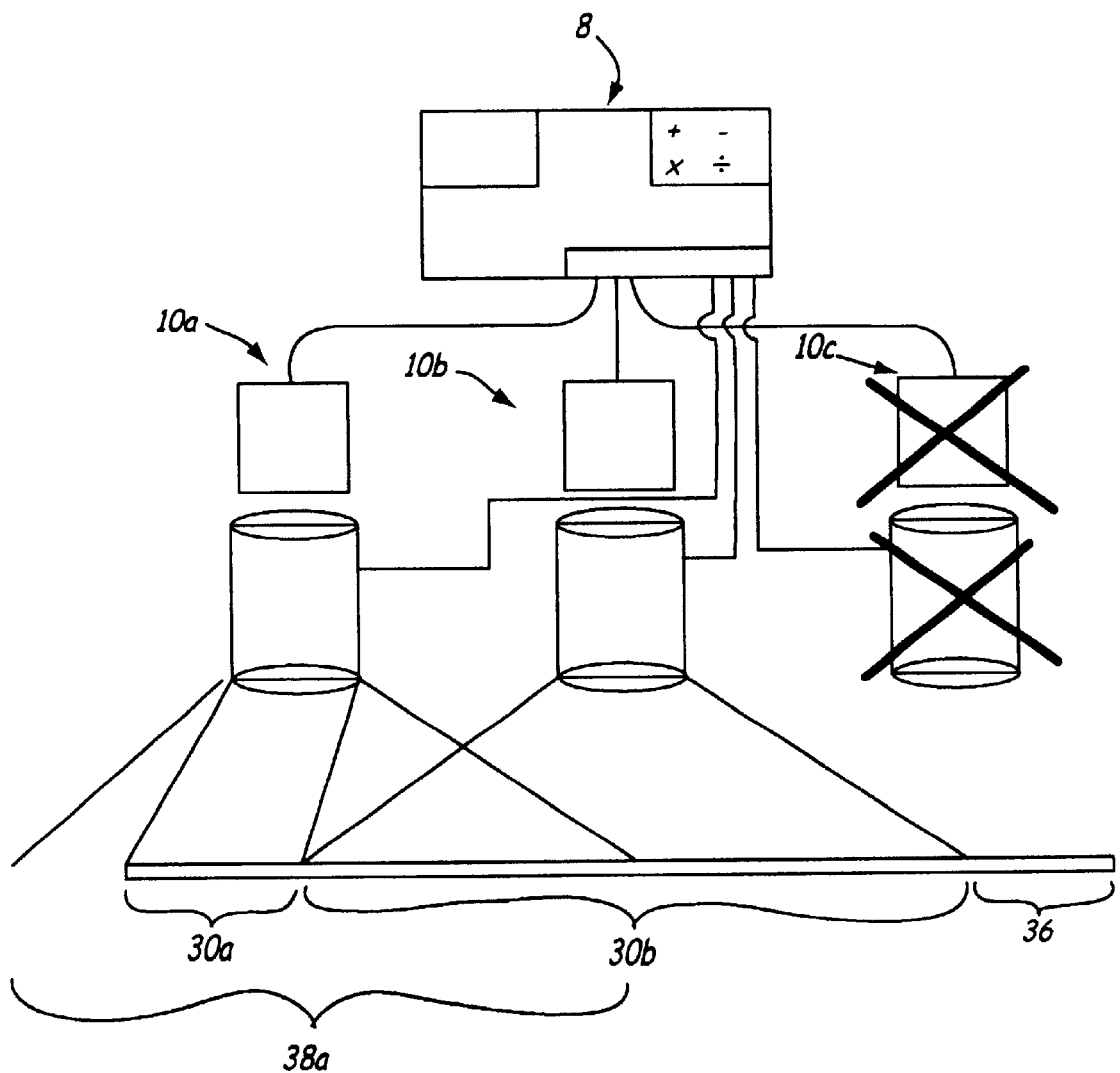
FIG. 4 is a schematic diagram showing the display system of FIG. 1 during a second failure condition.

FIG. 3 addresses the failure of a projection channel situated in the center of an array of projection channels, but it is also possible that other projection channels may fail or become otherwise inoperative. FIG. 4 shows an example in which a non-centrally disposed projection channel has become inoperative, which in this instance is third projection channel 10c. In such a case, because of design limitations it may not be possible to refocus first and second lens assemblies 14a, 14b so that display screen S is completely covered by light from first and second projection channels 10a, 10b. As shown in FIG. 4, even when first and second lens assemblies 14a, 14b have reached their maximum zooming capability, a dead space 36 may exist on the display screen. The presence of a dead space may be overcome by proportionately reformatting portions 30a, 30b projected by first and second projection channels 10a, 10b so that the entire desired image is displayed on display screen S. Alternately, it may be possible to design or pre-format the desired image so that no critical information will ever be displayed in dead space 36 even when all projection channels are operational. Regardless of the way in which dead space 36 is addressed, projection channels 10a and 10b are controlled by the controller to optimize the size and content of the displayed image. As previously described, this is accomplished by: adjusting one or more of lens assemblies 14a, 14b to maximize the size of the displayed image and/or to ensure that critical information is displayed; adjusting the brightness of light sources 16a and 16b; and reformatting the size, content and proportion of portions 30a and 30b.

Figure 5:
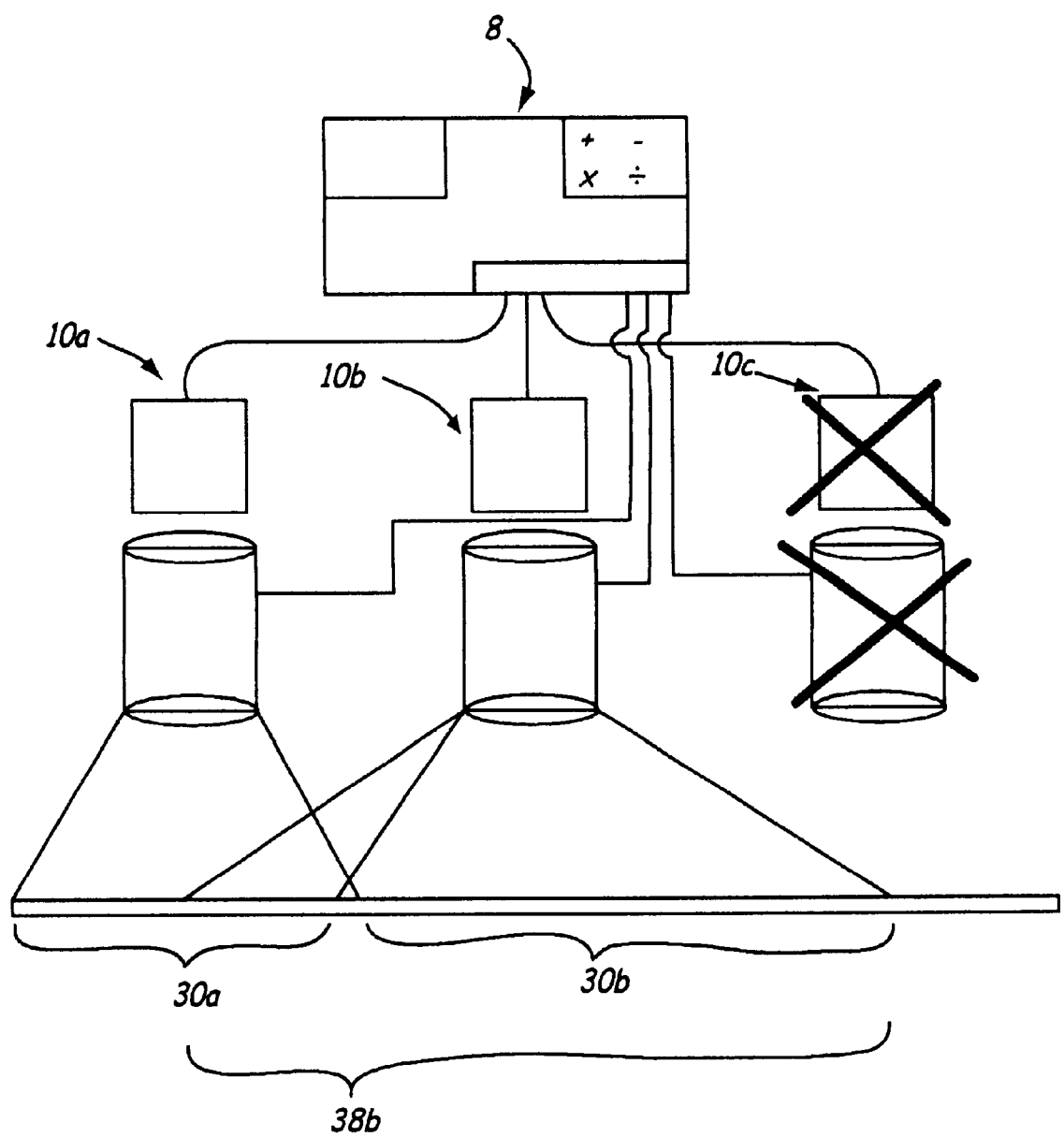
FIG. 5 is a schematic diagram showing the display system of FIG. 1 during a third failure condition.

It can be seen in FIG. 4 that portion 30b, which is projected by second projection channel 10b, is much larger than portion 30a, which is projected by first projection channel 10a. This may be done to prevent substantial overlap of the first and second portions, as well as to ensure that a critical part of the displayed image is projected by a single projection channel. In such a situation first projection channel 10a only projects portion 30a using a part of its projection range 38a. However, the relative differences in size between portions 30a and 30b may be varied as desired by reducing the size of portion 30b and increasing the size of portion 30a. This is shown in FIG. 5, where first projection channel 10a projects portion 30a over all of its projection range 38a, while second projection channel 10b projects portion 30b over a part of its projection range 38b.

In FIG. 4, first and second lens assemblies 14a, 14b are depicted as being zoomed to their maximum capability. FIG. 5 shows an alternate method of compensating for the failure of third projection channel 10c, in which first lens assembly 14a is not adjusted or zoomed. However, the coverage of display screen S is the same as that in FIG. 4.

An embodiment of the invention has herein been described. However, the invention should not be limited strictly to the embodiment or features disclosed above. Indeed, the invention may be varied in many ways consistent with the scope of the invention. For instance, the light source is not required to be an arc lamp, but may comprise any other type of light, such as light-emitting diodes (LED) or lasers. The light source may comprise a single light or multiple lights, which may be arranged in any suitable combination or array. For example, the light source may also comprise an array or micro-lasers comprised of laser LED's or other types of lasers. If the type of light is not easily dimmable or variable in brightness (such as arc lamp 17a), attenuating device 18a should be included in the light source. Attenuating device 18a may include a liquid-crystal panel, a variable mechanical aperture or iris, rotatable cross-polarizing filters, or other technologies. Attenuating device 18a need not be used if the type of light is variable in brightness and controllable by the controller. LCD's 22a, 24a, 26a may be either reflective or transmissive. Of course, optics (not shown) associated with the LCD's would necessarily need to be reconfigured depending on the type of LCD chosen. The resolution of the LCD's may be 1024×768 pixels, although other pixel definitions should work equally well for the purposes of the invention. LCD array 20a may also have a different number of LCD's or include a different combination of colors, depending on the desired output color scheme. The number of projection channels used in the invention may be more or less than three.

Figure 6:
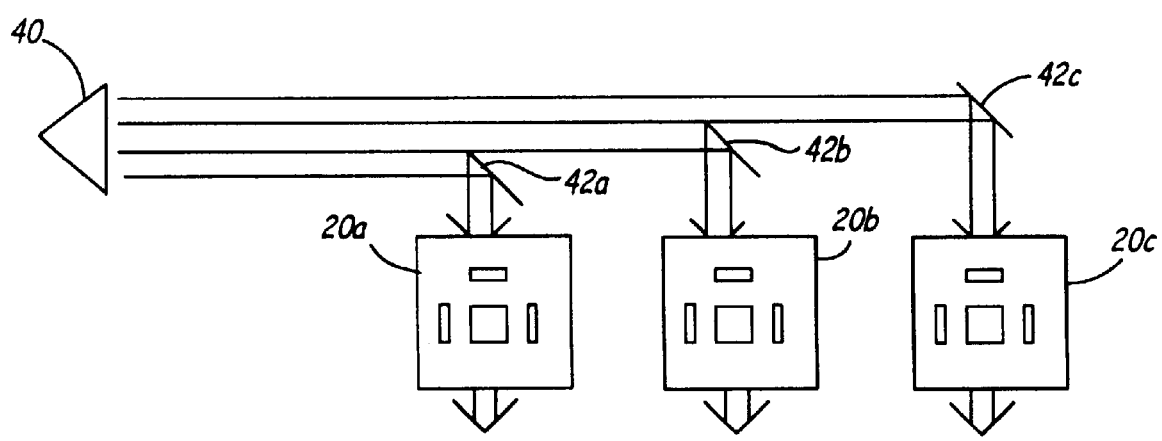
FIG. 6 is a schematic diagram showing a method of providing light to the light transmission modules according to another embodiment of the invention.

FIG. 6 shows another method of providing a light source to LCD arrays 20a in which a single light source 40 is used. Mirrors 42a, 42b and 42c reflect portions of the light so produced into LCD arrays 20a, 20b, and 20c, respectively. A single light source may be advantageous to ensure constant lighting among the projection channels.

As there are a finite number of projection channels, it may be advantageous to consider all possible failure combinations and then program memory 8b with the necessary adjustments to the light sources, LCD arrays, and lenses of all projection channels for each failure combination. Then, when a given projection channel fails or becomes inoperative, the controller accesses from memory 8b the corresponding compensation scheme for the given failure combination and instantly instructs the remaining projection channels to compensate for the failure. By pre-programming the controller to compensate for any combination of failure, the downtime of the display is therefore minimized and critical information is constantly displayed.

An advantage of the invention is that each projection channel does not require an independent redundant system. Failsafe operation of the display system is accomplished instead by adjusting the remaining operational display channels in the event of a failure. Eliminating independent back-up or redundant systems for each projection channel therefore saves considerable cost, space and assembly time.

Another advantage is that critical display information is always displayed, notwithstanding a failure of a projection channel. Indeed, the invention provides a means to ensure that critical information will be displayed even if only one projection channel remains functional.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A display system, comprising:
    a plurality of projection channels, each projection channel projecting a substantially mutually exclusive portion of an image onto a display area,
    a controller that determines the content and size of each portion that each projection channel projects onto the display area so that the image substantially fills the display area during normal conditions;
    wherein when one of the projection channels is inoperative, the controller adjusts the portions of the image that are projected by the operative projection channels to optimize the image on the display area.

2. The display system of claim 1, further including at least one light source that is configured to supply light to at least one of the projection channels.

3. The display system of claim 2, wherein the at least one light source includes an arc lamp.

4. The display system of claim 2, wherein the at least one light source includes a laser.

5. The display system of claim 2, wherein the at least one light source includes a light-attenuating device.

6. The display system of claim 5, wherein the light source is connected to the controller, and wherein the brightness of the light source is varied by the controller depending on how much of the image the projection channel is required to project.

7. The display system of claim 2, wherein each projection channel includes a light modulator that is connected to the controller and responsive to signals from the controller to modulate light from the at least one light source to form the portion of the image to be displayed by the projection channel.

8. The display system of claim 7, wherein each projection channel further includes a variably focusing lens assembly disposed between the light modulator and the display area and connected to the controller, wherein the variably focusing lens assembly is controlled by the controller to adjust the size of the portion of the image that is projected by the projection channel.

9. The display system of claim 8, wherein the controller further includes a content-controlling element that controls the content of the portion of the image that each projection channel projects, and further wherein the controller compensates for an inoperative projection channel by adjusting the content of the portions projected by the remaining operative channels.

10. The display system of claim 7, wherein the light modulator includes at least one liquid-crystal display (LCD).

11. A display system for projecting an image on a display area, the image having a size and a content, the system comprising:

a first projection channel that includes a first light modulator configured to modulate light to form a first portion of the image, and a first variably-focusable lens assembly that focuses the first portion of the image for display on the display area;

a second projection channel that includes a second light modulator configured to modulate light to form a second portion of the image, and a second variably-focusable lens assembly that focuses the second portion of the image for display on the display area;

a third projection channel that includes a third light modulator configured to modulate light to form a third portion of the image, and a third variably-focusable lens assembly that focuses the third portion of the image for display on the display area;

a controller that controls the first, second and third lens assemblies such that when the first, second and third projection channels are in an operative state, the first portion of the image is displayed on a first section of the display area, the second portion of the image is displayed on a second section of the display area, and the third portion of the image is displayed on a third section of the display area, wherein each of the first, second and third sections of the display area are substantially mutually exclusive and combine to cover substantially all of the display area, the controller being further configured so that, upon failure of one of the projection channels, the controller adjusts the portions of the image to be projected by the remaining operative channels by controlling the light modulators and the variably-focusing lens assemblies of the remaining operative projection channels to optimize the size and content of the image.

12. The display system of claim 11, further including at least one light source that is configured to supply light to at least one of the projection channels.

13. The display system of claim 12, wherein the at least one light source includes an arc lamp.

14. The display system of claim 12, wherein the at least one light source is a variable-brightness light source.

15. The display system of claim 14, wherein the variable-brightness light source is connected to the controller, and wherein the brightness of the light source is varied by the controller depending on how much of the image the projection channel is required to project.

16. The display system of claim 11, wherein each of the first, second and third light modulators include at least one liquid-crystal display.

17. A method of providing an image to a display screen, comprising:

providing a plurality of independent projection channels, each projection channel configured for modulating light to create a portion of the image and focusing the image on a section of the display screen;

determining the portion of the image that each projection channel is to project;

generating light for each projection channel;

modulating the light in each projection channel to produce each portion of the image;

focusing each portion of the image on a section of the display screen;

compensating for an inoperative projection channel by modifying the portions of the desired image that each operative projection channel is to project and by re-focusing each portion on the display screen, to thereby optimize the image that is displayed on the display screen.

18. The method of claim 17, wherein the inoperative projection channel is compensated for by enlarging the portions projected by the operative projection channels.

19. The method of claim 18, wherein the portions of the image are focused using an adjustable lens assembly, and wherein the portions projected by the operative projection channels are enlarged by controlling the adjustable lens assembly to zoom the portions of the image projected by the operative projection channels.

20. The method of claim 17, wherein each portion of the image has a content, and wherein the inoperative projection channel is compensated for by distributing the content of the inoperative projection channel among at least one of the operative projection channels.

* * * * *